(12) United States Patent
Schmidt et al.

(10) Patent No.: US 9,114,467 B2
(45) Date of Patent: Aug. 25, 2015

(54) METHOD OF SMOOTHING AND/OR BEVELLING AN EDGE OF A SUBSTRATE

(75) Inventors: Christian Schmidt, Le Bouveret (CH); Enrico Stura, Grandvaux (CH); Michael Linder, Neuchatel (CH)

(73) Assignee: PICODRILL SA, Lausanne (CH)

( * ) Notice: Subject to any disclaimer, the term of this patent is extended or adjusted under 35 U.S.C. 154(b) by 649 days.

(21) Appl. No.: 13/319,472

(22) PCT Filed: May 14, 2010

(86) PCT No.: PCT/EP2010/002989
§ 371 (c)(1),
(2), (4) Date: Nov. 8, 2011

(87) PCT Pub. No.: WO2010/130464
PCT Pub. Date: Nov. 18, 2010

(65) Prior Publication Data
US 2012/0055905 A1    Mar. 8, 2012

Related U.S. Application Data

(60) Provisional application No. 61/178,252, filed on May 14, 2009.

(51) Int. Cl.
*B23H 9/00* (2006.01)
*B23H 9/02* (2006.01)
*B28D 5/00* (2006.01)
(Continued)

(52) U.S. Cl.
CPC .. *B23H 9/02* (2013.01); *B28D 5/00* (2013.01); *C03B 29/025* (2013.01); *C03B 33/08* (2013.01)

(58) Field of Classification Search
CPC ............ B23H 9/00; B23H 1/00; B23H 1/022; B23H 1/024; B23H 1/02; B23H 7/04; B23H 7/26; B23H 11/00; B23H 1/10; B23H 1/08; B23K 9/013; B23K 35/0216; H01J 37/31; A24C 5/007; A43D 8/18
USPC .............................................. 219/384, 68–70
See application file for complete search history.

(56) References Cited

U.S. PATENT DOCUMENTS 3,510,287 A        5/1970  Panczner et al.
3,596,039 A  *     7/1971  Edmond ................. 219/69.17
4,486,642 A  *    12/1984  Inoue .................... 219/69.12
(Continued)

FOREIGN PATENT DOCUMENTS

EP    0 543 641    5/1993
EP    0 995 531    4/2000
(Continued)

OTHER PUBLICATIONS

International Search Report Issued Nov. 10, 2010 in PCT/EP10/002989 Filed May 14, 2010.

*Primary Examiner* — Thien S Tran
*Assistant Examiner* — Kuangyue Chen
(74) *Attorney, Agent, or Firm* — Oblon, McClelland, Maier & Neustadt, L.L.P.

(57) ABSTRACT

The present invention relates to a method of smoothing and/or bevelling an edge of a substrate. The present invention also relates to a substrate produced by the method according to the present invention, in particular a substrate having an edge smoothed and/or bevelled by the method according to the present invention.

18 Claims, 12 Drawing Sheets

(51) Int. Cl.
*C03B 29/02* (2006.01)
*C03B 33/08* (2006.01)

(56) References Cited

U.S. PATENT DOCUMENTS

| | | | |
|---|---|---|---|
| 4,503,318 A * | 3/1985 | Hall | 219/384 |
| 4,638,139 A * | 1/1987 | Pirone | 219/69.12 |
| 5,322,542 A | 6/1994 | Ogata et al. | |
| 5,498,848 A * | 3/1996 | Wakabayashi et al. | 219/69.17 |
| 5,904,865 A * | 5/1999 | Jariabek | 219/69.13 |
| 6,118,094 A * | 9/2000 | Hoy | 219/69.1 |
| 6,252,191 B1 * | 6/2001 | D'Amario | 219/69.13 |
| 6,281,462 B1 | 8/2001 | Iiyama et al. | |

FOREIGN PATENT DOCUMENTS

| | | | |
|---|---|---|---|
| GB | 1 214 922 | 12/1970 | |
| JP | 06-055354 A * | 3/1994 | B23H 7/10 |
| JP | 06055354 A * | 3/1994 | |
| JP | 06-315829 A * | 11/1994 | B23H 3/00 |
| JP | 06315829 A * | 11/1994 | |
| WO | WO 2007001347 A2 * | 1/2007 | |

* cited by examiner

METHOD OF SMOOTHING AND/OR BEVELLING AN EDGE OF A SUBSTRATE

The present invention relates to a method of smoothing and/or bevelling an edge of a substrate. The present invention also relates to a substrate produced by the method according to the present invention, in particular a substrate having an edge smoothed and/or bevelled by the method according to the present invention.

Many microtechnological applications and devices require substrates which serve as a base for subsequent manipulations. In many instances, these substrates are extensive and have sharp edges which have been produced due to the manufacturing process of the substrate. For example, glass substrates, in many instances are cut, and this cutting process generates extremely sharp edges in the resultant substrates. Sharp edges make the further handling of the substrate(s) rather difficult since they may cause injuries. Likewise, and perhaps even more importantly, however, these edges, although being extremely sharp, may exhibit small cracks or crevices. Upon further handling of the substrates and/or stress in their final application (such as solar panels), these cracks and crevices may further propagate from the edge(s) of the substrate into the substrate which will thus lead to an exacerbation of the problem, since ultimately, this problem may result in breakage or loss of quality of the substrate.

Current techniques which are used to smooth or bevel edges are largely mechanical, and they are either too slow, too expensive or too crude, such that even additional cracks are thereby introduced into substrates, especially brittle substrates.

Accordingly, it was an object of the present invention to provide for a method which allows to smoothen or bevel the edge(s) of a substrate. It was also an object of the present invention to provide for a method which reduces the problem of propagation of cracks of crevices from the edge(s) of a substrate into the substrate. It was also an object of the present invention to provide for a method of smoothing and/or bevelling the edge of a substrate which is easy to perform. It was also an object of the present invention to provide for a method of smoothing and/or bevelling an edge of a substrate which method is inexpensive.

All these objects are solved by a method of smoothing and/or bevelling an edge of a substrate, comprising the steps:
a) providing a substrate having an edge,
b) providing an electrode connected to a voltage source and positioning the electrode at a distance of from 0.01 mm to 10 cm from the edge of said substrate,
c) moving said electrode and/or said substrate in relation to each other in the direction of said edge, whilst applying a voltage to said edge by means of said electrode, said voltage having an amplitude in the range of from 100 V to $10^7$ V and having a frequency in the range of from 10 kHz to 10 GHz, thereby causing electric arc formation between said electrode and said edge and thereby heating said edge.

In one embodiment step c) is performed such that material of said edge, previously subjected to arc formation in step c), is lifted from the substrate.

In one embodiment step c) is performed such that material of said edge, previously subjected to arc formation in step c), is melted, but not lifted from the substrate.

In one embodiment lifting of material of said edge or, alternatively, melting is influenced by appropriate choice and control of one or several of the following parameters: amplitude of voltage applied in step c), frequency of voltage applied in step c), impedance of voltage source connected to electrode, distance between edge of substrate and electrode, speed of relative movement between electrode and substrate, and grounding of substrate, if any.

In one embodiment said voltage source is a Tesla transformer.

In one embodiment said substrate is made of a material selected from electrically insulating material such as glass, quartz, diamond, alumina, sapphire, aluminium nitride, zirconia, and spinel, electrically semiconducting materials, such as silicon, including doped silicon and crystalline silicon, germanium, compound semiconductors such as gallium arsenide and indium phosphide, and electrically conducting materials, such as metals.

In one embodiment said electrode is a pointed electrode having a longitudinal axis, which, during step c), points to towards said edge of said substrate.

The objects of the present invention are solved by a substrate having an edge smoothed and/or bevelled by the method according to the present invention.

As used herein, the term "edge" is meant to refer to the border between two faces of a substrate or between two sides of a substrate. Such two sides of a substrate or such two faces of a substrate meet at an angle which is not 0 degrees and not 180 degrees. In preferred embodiments, the angle enclosed by such two sides or such two faces of a substrate is in the range of from 10 degrees to 170 degrees, preferably from 40 degrees to 140 degrees, more preferably 70 degrees to 110 degrees, even more preferably from 80 degrees to 100 degrees and most preferably around 90 degrees. This is also sometimes herein referred to as an "edge of x degrees", or "x degrees angle", the value x denoting the angle between the two sides or faces meeting at such edge.

The term "to bevel", as used herein, is meant to refer to a process of chamfering and is used synonymously therewith.

The substrates in accordance with the present invention have considerable extensions in the x- and y-directions, whereas the extension in the z-direction may be comparatively small (in comparison to the x- and y-dimensions). Substrates in accordance with the present invention may be electrically insulating, such as glass or quartz, electrically semiconducting, such as elemental silicon, compound semiconductors, or they may be electrically conducting, such as metals.

The distance at which the electrode is positioned with respect to the edge of the substrate is in the range of from 0.01 mm to 10 cm. In one embodiment, this distance between the electrode and the edge is maintained, even when the electrode and the substrate are moved in relation to each other, thus moving one or both in relation to each other, but equidistantly from each other. For example, the electrode may be moved along the edge of a substrate whilst maintaining a distance between the electrode and the substrate of 0.01 mm to 10 cm.

The electrode in accordance with the present invention may adopt any shape, but preferably, it has a longitudinal axis, which longitudinal axis, during performance of step c), points towards the substrate. An electrode with a relatively sharp end point/tip also facilitates ignition of the electric arc as the electric field concentration around the tip promotes the ionization of the surrounding medium/atmosphere. The latter may be controlled in order to achieve optimal process conditions by e.g. selection of gas or liquid composition, pressure and temperature.

The inventors have surprisingly found that, by using an electrode and applying a voltage to the edge of a substrate using such electrode, it is possible to bevel and/or smooth an edge of a substrate. The electric arc that is formed between the electrode and the edge, upon application of a voltage, is believed to heat the edge. Surprisingly, upon arc formation and relative movement of the electrode and the substrate with respect to each other, the edge, insofar as it is heated, will subsequently lift from the substrate and leave a bevelled/smoothed trace behind on the substrate. Without wishing to be bound by any theory, the present inventors believe that it is thermal tensions along the edge during the heating and/or the subsequently cooling down upon relative movement of the electrode and the substrate with respect to each other, which will cause the edge to lift from the substrate and thereby leave a trace of smoothing/bevelling behind, on the edge. In one embodiment, the voltage that is applied has an amplitude in the range of from $10^2$ V to $10^7$ V, preferably $5 \times 10^2$ V to $1 \times 10^6$ V, more preferably $10^3$ V to $10^5$ V. Also, in one embodiment, the voltage is a high frequency voltage, having a frequency in the range of from 10 kHz to 10 GHz, preferably 100 kHz to 1 GHz, more preferably 1 MHz to 100 MHz. Such high frequencies can for example be generated using a Tesla transformer. The distance at which the electrode is positioned from the edge depends on the substrate material, the voltage amplitude and frequency to be applied, and the speed at which the electrode and the substrate are moved with relation to each other. In one embodiment, such distance is in the range of from 0.01 mm to 10 cm. In one embodiment, the speed at which the electrode and the substrate (edge) are moved with respect to each other, is in the range of from 0.1 mm/s to 100 mm/s. The depth to which a lift of edge material from the substrate occurs can be influenced by appropriate choice and control of one or several of the following parameters: amplitude of voltage applied in step c), frequency of voltage applied in step c), impedance of voltage source connected to electrode, distance between edge of substrate and electrode, speed of relative movement between electrode and substrate, and grounding of substrate, if any. In one embodiment, the process is performed in such a manner that no lift of edge material occurs, but the edge is simply heated and melted. In this instance, the process is performed in such a manner that the tensions which may arise during heating and/or cooling of the edge will not suffice to cause an ablation of the edge material. Instead this type of process will lead to a smoothing of the edge.

In both types of process, the electrode, during performance of the method according to the present invention, is moved along the edge during voltage application, and electric arc formation occurs.

The outcome of performing the method in accordance with the present invention is a substrate which has an edge that has either been melted and smoothed, without material having been removed from the edge, or an edge that has been bevelled, wherein some material has been removed from the edge. In one embodiment, the two processes may also occur together, i.e. an edge may become bevelled by removal of material from the edge, and this bevelled edge may subsequently be subjected to a further performance of step c) of the method in accordance with the present invention, this time such step c) being modified, thus avoiding a removal of material from the bevelled edge but simply melting the bevelled edge, thus leading to a further smoothing of the bevelled edge.

Hence, in accordance with the present invention, one embodiment thereof comprises the steps:

a) providing a substrate having an edge,
b) providing an electrode connected to a voltage source and positioning the electrode at a distance of from 0.01 mm to 10 cm from the edge of said substrate,
c) moving said electrode and/or said substrate in relation to each other in the direction of said edge, whilst applying a voltage to said edge by means of said electrode, said voltage having an amplitude in the range of from 100 V to $10^7$ V and having a frequency in the range of from 10 kHz to 10 GHz, thereby causing an electric arc between said electrode and said edge and thereby heating said edge such that said edge is lifted from the substrate,
d) subjecting the substrate resulting from step c) to a further step c') moving said electrode and/or said substrate in relation to each other, in the direction of said edge, whilst applying a voltage to said edge by means of said electrode, said voltage having parameters, such as amplitude and/or frequency, adjusted to reduce power dissipation per edge unit by 5-95% compared to (c), thereby causing electric arc formation between said electrode and said edge and thereby melting the edge, but not lifting the edge from the substrate.

Upon performing the method in accordance with the present invention, substrates can be produced, which have bevelled and/or smoothed edges which no longer contain cracks or crevices, or at least have the occurrence of such cracks or crevices strongly reduced. The substrates thus produced have fewer problems of propagation of cracks or crevices from the edge to the bulk/interior of the substrate. The method in accordance with the present invention is easy to perform and inexpensive. Depending on the substrate material, a person skilled in the art can determine the appropriate values to be taken for the parameters of voltage amplitude, voltage frequency, distance between edge of substrate and electrode, and speed of relative movement between electrode and substrate.

Typical value ranges that are employed for achieving a bevelling of an edge, i.e. wherein some material has been removed from the edge are 2-6 mm/s as speed of relative movement between electrode and substrate, <2.5 mm as distance between edge of substrate and electrode, 8 MHz as voltage frequency, and 2000 V-5000 V as voltage amplitude. Typical value ranges for achieving a smoothing of an edge, i.e. wherein material at the edge has been melted, but no material has been removed from the edge, are 1-2 mm/s as speed of relative movement between electrode and substrate, ≥2.5 mm as distance between edge of substrate and electrode, 8 MHz as voltage frequency, and 0.7 times the voltage used for bevelling as voltage amplitude for smoothing; for example, if the voltage amplitude used for bevelling was 4000 V, the voltage amplitude that would be used for only smoothing the edge would be approximately 0.7×4000 V=2800 V. The aforementioned values are exemplary values and should, by no means, be construed to be limiting.

A variety of substrates may be used in accordance with the present invention, including electrically insulating substrates and electrically semiconducting substrates. A preferred electrically insulating substrate, also because of its vast range of commercial applications, is glass, such as soda lime glass. The thickness of the substrate is not particularly limited; typical exemplary ranges are from 0.1 mm to 10 cm, preferably 1 mm to 1 cm, more preferably 1 mm to 5 mm. The method in accordance with the present invention greatly facilitates the production of e.g. glass substrates which may subsequently be used in the fabrication of windows, photovoltaic devices, such as solar cells, and light emitting devices, such as LEDs. In this context it should be noted that for particularly thin substrates, such as substrates having a thickness ≤1.5 mm, preferably ≤1 mm, the use of an additional support substrate may be necessary which acts as a heat sink during exposure to the electric arc. For this embodiment using a heat sink, a description is given further below.

The voltage source may for example be a Tesla transformer. Without wishing to be limited thereto, in the following some typical setups (1-6) are listed which have been successfully used for performing the method in accordance with the present invention, indicating relevant parameters for the primary and secondary coil:

| Tesla coil | Setup 1 | Setup 2 | Setup 3 | Setup4 | Setup 5 | Setup 6 |
|---|---|---|---|---|---|---|
| Secondary | | | | | | |
| Wire diameter in mm | 0.1 | 0.1 | 0.1 | 0.5 | 0.5 | 0.5 |
| coil diameter in mm | 20 | 20 | 20 | 20 | 20 | 20 |
| winding length in mm | 30 | 20 | 10 | 60 | 40 | 30 |
| additionnal capacitance in pF | 1 | 1 | 1 | 1 | 1 | 1 |
| turn for 95% | 285 | 190 | 95 | 114 | 76 | 57 |
| secondary inductance in uH | 820 | 490 | 187 | 74 | 46 | 33 |
| secondary capacitance in pF | 0.945 | 0.930 | 1.039 | 1.158 | 1.000 | 0.945 |
| resonnance frequency in MHz | 3.99 | 5.18 | 8.15 | 12.58 | 16.52 | 19.93 |
| wire length in m | 18 | 12 | 6 | 7 | 5 | 4 |
| wire resistance in Ohm | 38 | 26 | 13 | 1 | 0 | 0 |
| Q at f0 | 536 | 624 | 750 | 9564 | 11790 | 13401 |
| Primary | | | | | | |
| Primary wire diameter in mm | 1 | 1 | 1 | 1 | 1 | 1 |
| Primary coil diameter in mm | 15 | 15 | 15 | 15 | 15 | 15 |
| winding length in mm | 5 | 5 | 5 | 5 | 5 | 5 |
| Primary turns | 2 | 2 | 2 | 2 | 2 | 2 |
| Primary inductance in uH | 0.075 | 0.075 | 0.075 | 0.075 | 0.075 | 0.075 |
| wire length in cm | 30 | 30 | 30 | 30 | 30 | 30 |
| wire resistance in ohm in DC | 0.006 | 0.006 | 0.006 | 0.006 | 0.006 | 0.006 |
| wire resistance in ohm at f0 | 0.051 | 0.057 | 0.072 | 0.089 | 0.102 | 0.111 |
| Rac/Rdc | 7.9 | 9.0 | 11.2 | 13.8 | 15.8 | 17.3 |
| Turn ratio | 142.5 | 95 | 47.5 | 57 | 38 | 28.5 |
| SQRT(inductance ratio) | 104 | 81 | 50 | 31 | 25 | 21 |
| Primary voltage in V | 12 | 12 | 12 | 12 | 12 | 12 |
| Secondary voltage in kV | 2.5 | 1.9 | 1.2 | 0.8 | 0.6 | 0.5 |

The primary voltage typically was in the range of from 1-100 V, preferably 5-50 V, more preferably 6-25 V, and was sometimes also pulse width modulated to vary the power with otherwise constant Tesla parameters.

In one embodiment, in step a), said substrate to be bevelled is put into thermal contact with a support substrate, said support substrate acting as a heat sink, when said substrate to be bevelled or smoothed is heated in step c). Such support substrate is used in particular in those instances, where the substrate to be bevelled is amenable to the creation of internal tensions, when it is heated. This is the case, in particular, when the substrate to be bevelled or smoothed is particularly thin. In one embodiment, such a "thin" substrate has a thickness in the range of ≤1.5 mm, preferably ≤1 mm. In one embodiment, said support substrate is in physical contact with said substrate to be bevelled, either directly by touching it, or by means of an intermediate layer between said support substrate and said substrate to be bevelled, wherein, preferably, said intermediate layer is a fluid, preferably a liquid, such as water. Such intermediate layer acts to improve the thermal transfer between the substrate to be bevelled and the support substrate, and it may also act as an enhancer of adhesion between the two substrates, thus preventing any relative movement between the two substrates. In one embodiment, the fluid intermediate layer acts as an adhesion enhancer due to capillary forces between the two contacting surfaces of the two substrates. In one embodiment, said substrate to be bevelled has a bottom side and a top side, and said support substrate has a bottom side and a top side, and said bottom side of said substrate to be bevelled touches the top side of said support substrate, or said top side of said substrate to be bevelled touches said bottom side of said support substrate. In one embodiment, the substrate to be bevelled is laid on said support substrate, and adhesion of said substrate to be bevelled to said support substrate is achieved by the weight of the substrate to be bevelled. In one embodiment, said support substrate is actively cooled during step c), by applying a stream of gas or liquid, or a mixture of gas and liquid, or a mixture of gas and solid to said support substrate, preferably at a side of said support substrate facing away from said substrate to be bevelled. In one embodiment, said substrate to be bevelled has a thickness ≤1.5 mm, preferably ≤1 mm. In one embodiment, said support substrate has a thickness in the range of from 1 mm to 10 cm, preferably from 2 mm to 5 cm, more preferably from 3 mm to 1 cm.

In one embodiment, the support substrate is made of an electrically insulating, semiconducting or conducting material, preferably having a high thermal conductivity. Examples of electrically insulating materials are glass, ceramics and oxides. Examples of electrically semiconducting materials are silicon (amorphous, polycrystalline or monocrystalline forms), germanium and compound semiconductors. Examples of electrically conducting materials are metals. One example of glass substrate is soda lime glass. It should be noted that the substrate thickness of the support substrate is chosen such as to be related to the desired chamfer depth and to the physical characteristics of the substrate to be bevelled, such as, but not limited to the coefficient of the thermal expansion, the thermal conductivity and the heat capacity of the substrate to be bevelled. The embodiment, where the aforementioned support substrate is used allows to smooth and/or bevel and/or chamfer an edge of a substrate even in those cases, where a chamfering/bevelling cannot be performed, due to the creation of thermal tensions, such as in thin substrates. With respect to this embodiment using a support substrate, typical value ranges that are employed for achieving a bevelling/chamfering of an edge are 3-6 mm/s as a speed of relative movement between the electrode and the substrate, 1-3 mm as distance between the edge of the substrate and the electrode, 8 MHz as voltage frequency and 2000 V-5000 V as voltage amplitude, 5 mm as thickness of the support made of soda lime glass. The aforementioned values are exemplary and should, by no means, be construed to be limiting. The embodiment where a support substrate is used is particularly suitable for thin substrates which are amenable to formation of cracks due to thermal tensions, and also to substrates which do not have sufficient mechanical stability. The support substrate, in some of these instances, may also act to keep the substrate to be bevelled straight.

The inventors have found that, by using a thermally conductive support substrate, it is possible to reduce the lower limit of the thickness for the substrates to be chamfered/bevelled using the method described further above. Without wishing to be bound by any theory, the inventors believe that the heat introduced in the substrate by the exposure to the electric arc requires enough matter to create a thermal gradient that is high enough to create the tensions required to achieve a lifting of material from the edge. If the substrate is not sufficiently thick, the rather limited amount of matter of the substrate must contain all the heat introduced during the exposition of the substrate to the electric arc during step c). Consequently, the temperature rises also in locations which are removed from the edge of the substrate to be bevelled. Using a support substrate, which is in contact with the substrate to be bevelled, wherein the support substrate is made of a material having a high thermal conductivity and/or high heat capacity, ensures that the heat reaching the face opposite the processed side, including the edge to be bevelled/chamfered, can leave the substrate, and thereby avoids a local temperature rise in positions where no such temperature rise is desired. Thus, effectively, the use of a support substrate allows the formation of the desired temperature gradient which is required for the process of chamfering/bevelling to work correctly.

It should also be noted that the use of a support substrate is not necessarily limited to those methods of bevelling and/or chamfering the edge of a substrate wherein the heat is introduced using the application of a high frequency voltage. Instead, such support substrate may also be used in those embodiments where the heat is introduced using other methods, such as irradiation of a laser onto the edge of the substrate, heating by means of a pointed gas flame, heating by means of a heating filament. Accordingly, the objects of the present invention are also solved by a method of smoothing and/or bevelling an edge of a substrate, comprising the steps:

a) providing a substrate to be smoothed and/or bevelled, said substrate having an edge,
b) putting said substrate to be bevelled into thermal contact with a support substrate, said support substrate acting as a heat sink, when said substrate to be bevelled or smoothed is heated,
c) applying heat to the edge to be smoothed and/or bevelled, using electric arc formation, irradiation by a laser, heating using a pointed gas flame, heating using a heating filament, or any other technique which exploits thermal gradients to obtain a material separation. Also in these embodiments, the support substrate is as further defined above. In one embodiment, said support substrate is in physical contact with the said substrate to be bevelled, either directly by touching it or by means of an intermediate layer between said support substrate and said substrate to be bevelled, wherein, preferably, said intermediate layer is a fluid, preferably a liquid, such as water.

In one embodiment, the bottom side of said substrate to be bevelled touches the top side of said support substrate, or the top side of said substrate to be bevelled touches the bottom side of said support substrate. In one embodiment, the support substrate is actively cooled during step c), by applying a stream of gas or liquid, or a mixture of gas and liquid, or a mixture of gas and solid to said support substrate, preferably at a side of said support substrate facing away from said substrate to be bevelled. In one embodiment, said substrate to be bevelled has a thickness ≤1.5 mm, preferably ≤1 mm. In one embodiment the support substrate has a thickness in the rage of from 1 mm to 10 cm, preferably from 2 mm to 5 cm, more preferably from 3 mm to 1 cm.

Furthermore, reference is made to the following exemplary figures, which are given to illustrate, not to limit the present invention:

FIG. 3 shows an exemplary embodiment of the lift-process subsequent to electric arc exposure. The figures shows that a part (6) of the edge (5) has been exposed to electric arc formation in accordance with the present invention. The upper part (7) of the edge (5) will lift thereof and leave a bevelled edge (6). The dimensions of the part (7) that is lifted from the edge, as well as the dimensions of the part of the edge which remains (6) can be controlled by appropriate choice and control of one or several of the following parameters: amplitude of voltage applied in step c), frequency of voltage applied in step c), impedance of voltage source connected to the electrode, distance between edge of substrate and electrode, speed of relative movement between electrode and substrate, and grounding of substrate.

FIG. 5 (panels A and B) shows photographic images and an electron micrograph (panel C) which have been taken during the bevelling process of a glass substrate, which show the bevelled edge and the upper part of the edge that was lifted off and that is still attached to the bulk material, since the process is not finished yet.

Figure 1:
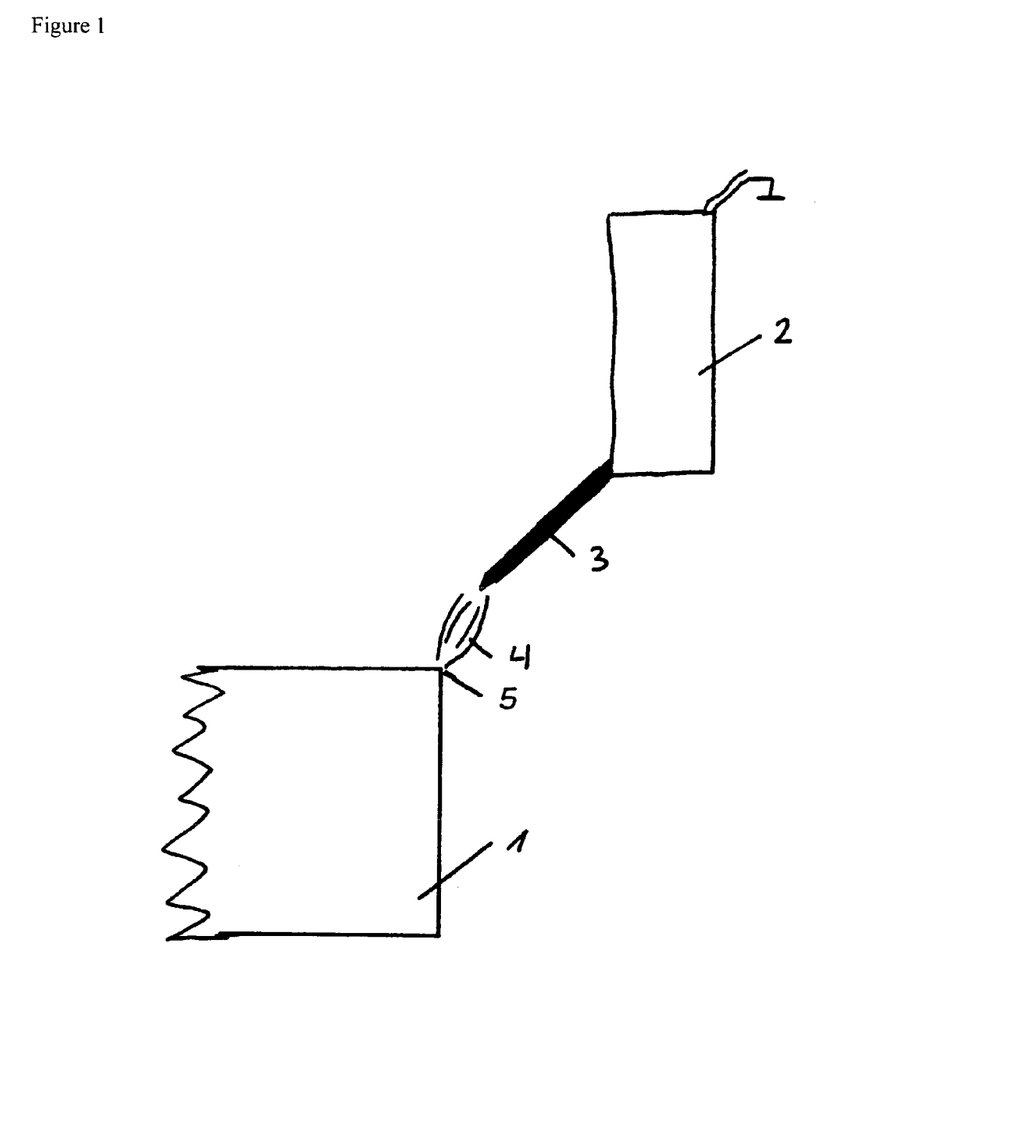
FIG. 1 shows an exemplary embodiment of a substrate (1) having its edge (5) exposed to the electrode (3). The electrode (3) is connected to a generator (2) which may or may not be explicitly/directly grounded. Upon voltage application/generation by the generator (2), an electric arc forms between the edge and the electrode. The electrode and/or the substrate are moved in relation to each other in the direction of said edge, to expose only a part or the complete edge, along its entire length (5), to the electrode.
Figure 2:
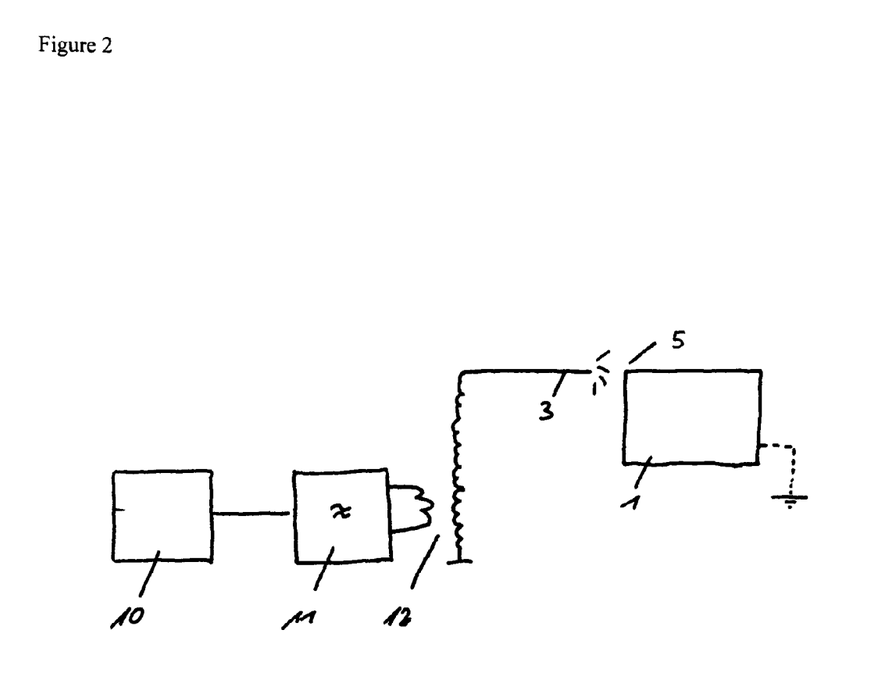
FIG. 2 shows an exemplary embodiment of the method in accordance with the present invention, wherein a power supply (10) is connected to an oscillator (11) which drives the primary coil of a Tesla transformer (12). The output of the Tesla transformer is connected to an electrode (3) which originates an electric arc that comes to contact the edge (5) of the substrate (1). The substrate may, at some point, be directly grounded, but this is not always necessary.
Figure 3:
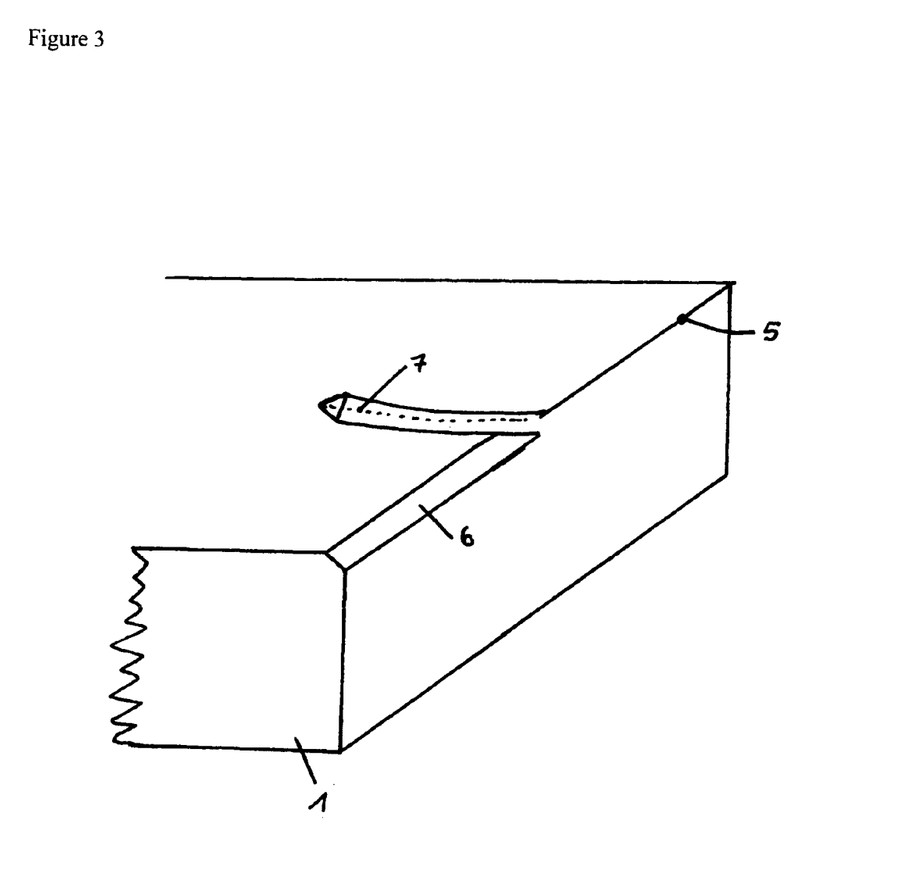
Figure 4:
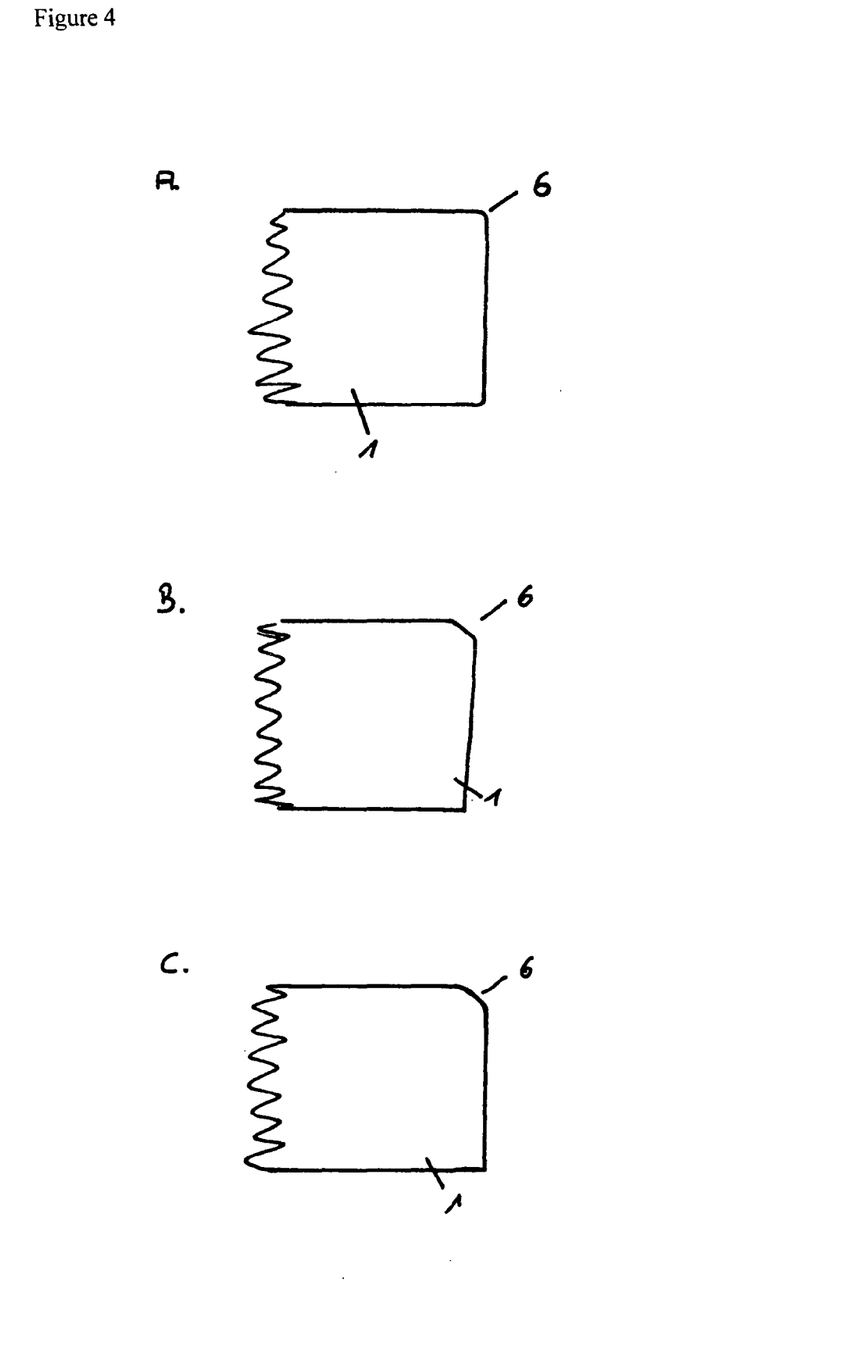
FIG. 4 shows embodiments of various edge formation modi: panel (A) shows an embodiment, in which a lift of edge material from the edge is avoided, but only the edge is melted through performing the method in accordance with the present invention, thus leading to a smoothing of the edge. In panel (B), part of the edge is lifted off, and subsequently removed, and a bevelled edge is thus produced. Without wishing to be bound by any theory, the present inventors believe that the lifting of edge material from the edge is caused by the generation of thermal tensions during the heating of the edge and/or its subsequent cooling. These tensions lead to a "controlled" lifting of edge material from the edge, thus allowing the formation of a bevelled edge as described and shown in the figure. In panel (C), the two processes of panels (A) and (B) have been combined, such that firstly, material from the edge is lifted and subsequently removed, and thereafter, the resulting bevelled edge is melted, thus leading to a smoothing of such bevelled edge.
Figure 5:
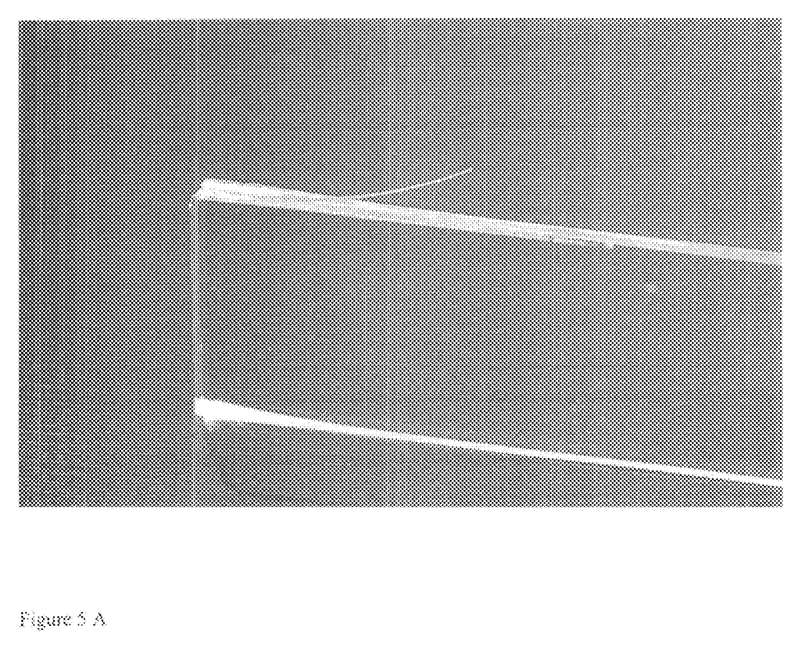
Figure 5B:
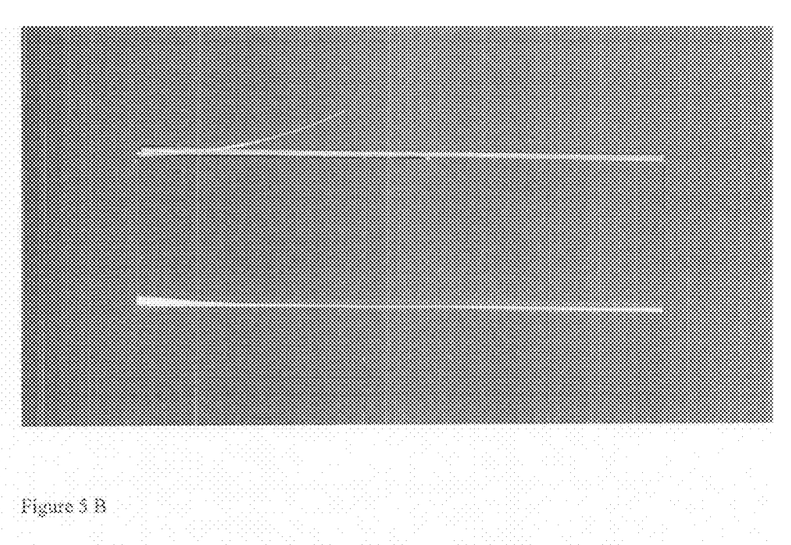
Figure 6:
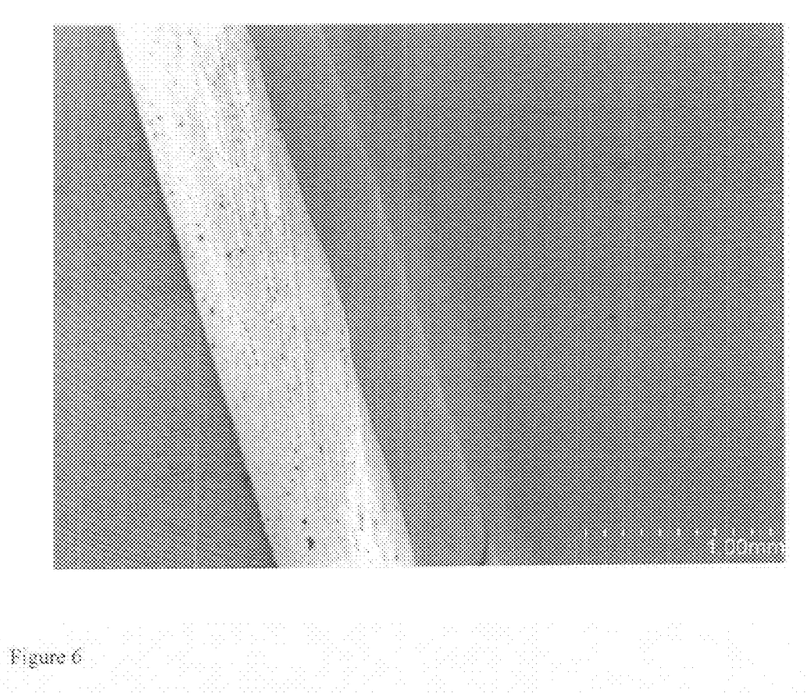
FIG. 6 shows an electron micrograph of the substrate of FIG. 5, illustrating the surface properties of the bevelled edge.
Figure 7:
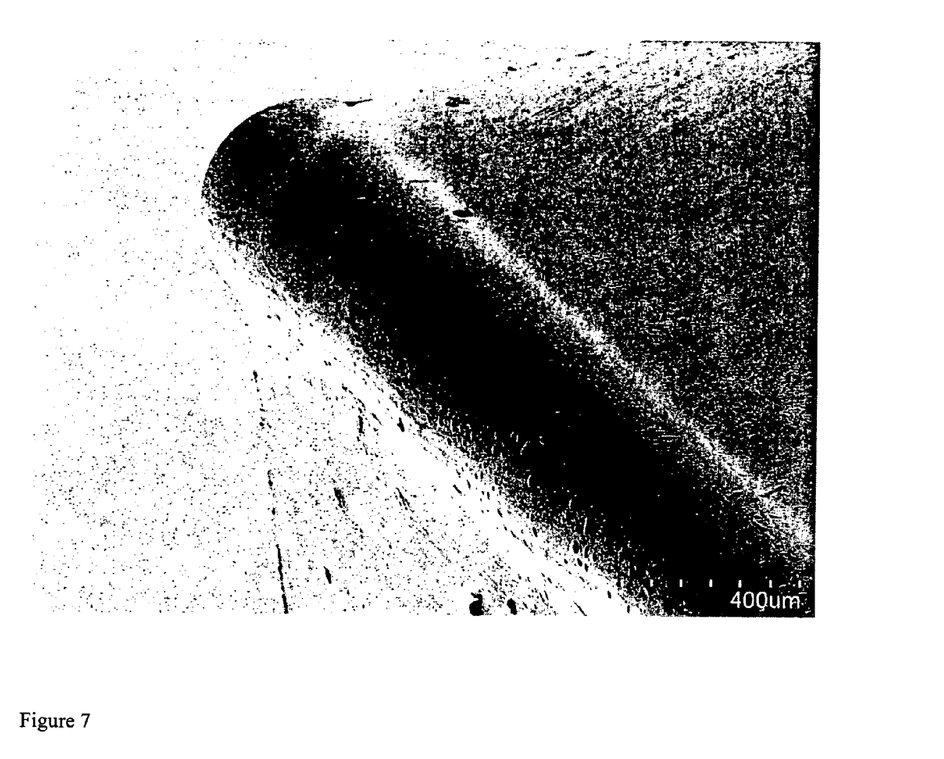
FIG. 7 shows an electron micrograph, illustrating the surface properties of a molten and smoothed edge of a glass substrate.
Figure 8:
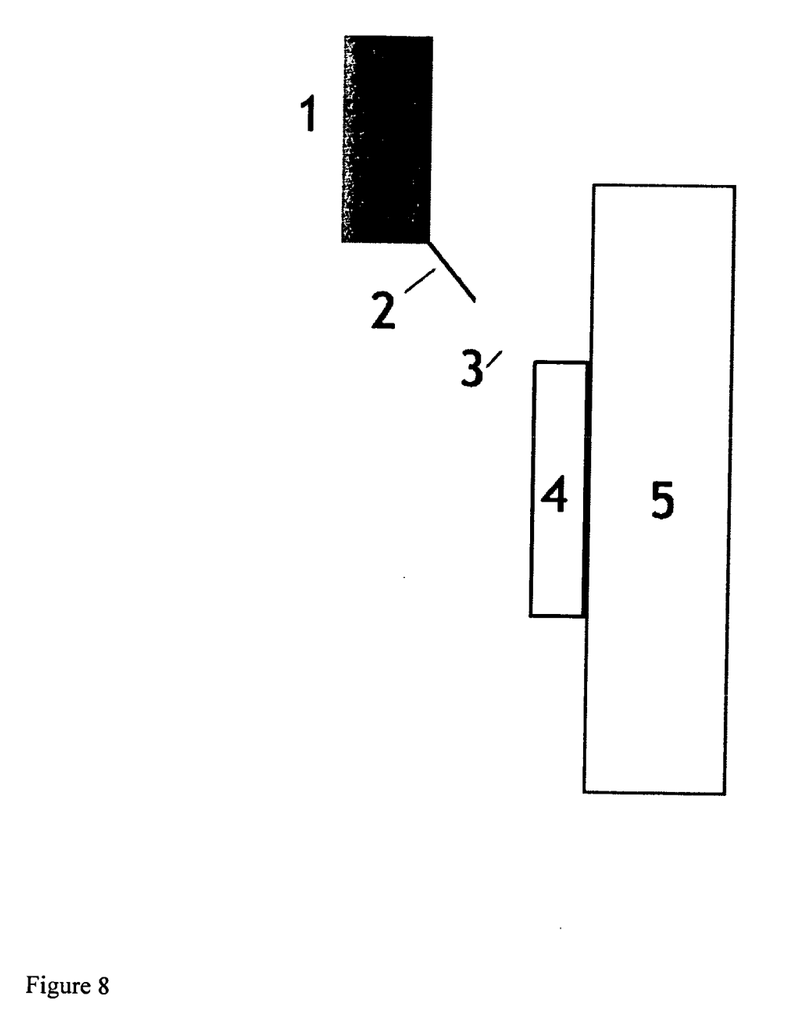
FIG. 8 shows an exemplary embodiment of a substrate (4) having its edge exposed to an electric arc (3) generated by the electrode (2) connected to a generator (1). The substrate (4) is in contact with the support substrate (5) in accordance with the present invention. The electrode and/or the substrate to be bevelled are moved in relation to each other along the direction of said edge, to expose only a part or the entire edge to the electrode.
Figure 9:
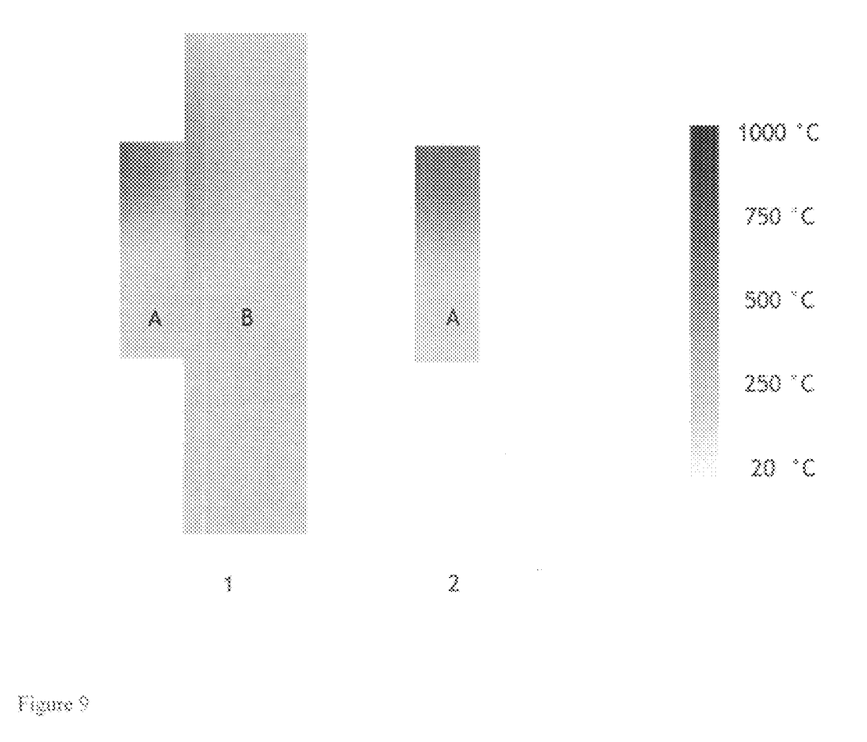
FIG. 9 shows a qualitative analysis of the temperature reached by the substrate (A) processed according to the method described by the priority application (U.S. provisional application No. 61/178,252), in case (1) of applying a support substrate B in accordance with the present invention, and (2) in case of processing without using such support substrate.
Figure 10:
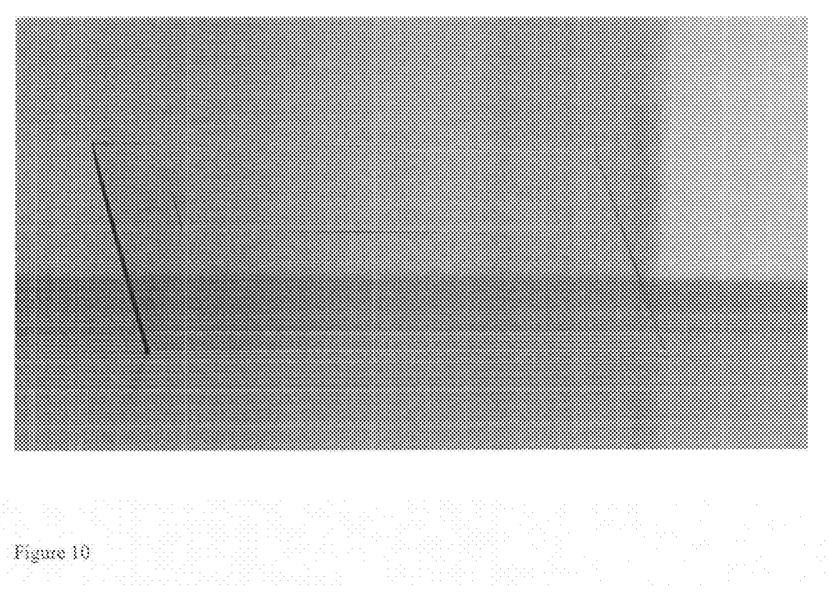
FIG. 10 shows a possible application of a 4 mm thick soda lime glass support to process a 0.7 mm thick substrate made of borosilicate glass. A small quantity of water is acting as a intermediate layer, mediating the contact between the two substrates, working both as a thermal exchange medium and as an agent which mechanically fixes the smaller substrate to the bigger support (by means of capillary forces).

The features of the present invention disclosed in the specification, the claims and/or in the accompanying drawings, may, both separately, and in any combination thereof, be material for realising the invention in various forms thereof.

The invention claimed is:

1. A method of thermally treating a substrate having a sharp edge, comprising:
   a) positioning an electrode connected to a voltage source at a distance of from 0.01 mm to 10 cm from the sharp edge of the substrate; and
   b) moving the electrode, the substrate, or both, in relation to each other in the direction of the sharp edge, while applying a voltage to the sharp edge with the electrode, wherein the voltage has an amplitude in the range of from 100 V to $10^7$ V and has a frequency in the range of from 10 kHz to 10 GHz, thereby causing electric arc formation between the electrode and the sharp edge;
   c) thereby heating the sharp edge to a degree such that either a portion of the sharp edge melts to smooth the edge or a portion of the sharp edge separates from the substrate and forms a beveled edge on the substrate where the portion separated;
   wherein
   the substrate is an electrically insulating material or an electrically semiconducting material, and
   the edge being thermally treated is a border between two faces of the substrate or a border between two sides of the substrate.

2. The method of claim 1, wherein a portion of the sharp edge separates from the substrate and forms a beveled edge on the substrate where the protion separated.

3. The method of claim 1, wherein a portion of the sharp edge melts to smooth the edge.

4. The method of claim 2, wherein the thermal treatment is controlled by at least one variable selected from the group consisting of:
   an amplitude of the voltage applied;
   a frequency of the voltage applied;
   an impedance of the voltage source connected to the electrode;
   a distance between the edge of the substrate and the electrode;
   a speed of relative movement between the electrode and the substrate; and
   a grounding of the substrate.

5. The method of claim 1, wherein the voltage source is a Tesla transformer.

6. The method of claim 1, wherein the electrode is a pointed electrode having a longitudinal axis, which points towards the edge of the substrate.

7. The method of claim 1, further comprising moving the electrode, the substrate resulting from the applying of voltage, or both, in relation to each other, in the direction of the edge, wherein the applied voltage to the edge is reduced by 5-95% compared to the voltage applied in operation b), thereby melting the edge, but not separating a portion from the edge of the substrate.

8. The method of claim 1, wherein the substrate to be thermally treated is placed in thermal contact with a support substrate, which acts as a heat sink.

9. The method according to claim 8, wherein the support substrate is in physical contact with the substrate either directly by touching it or by an intermediate layer between the support substrate and the substrate.

10. The method of claim 8, wherein the substrate has a bottom side and a top side, and the support substrate has a bottom side and a top side, and the bottom side of the substrate touches the top side of the support substrate, or the top side of the substrate to be bevelled touches the bottom side of the support substrate.

11. The method of claim 8, wherein the support substrate is actively cooled during operation b), by applying a stream of gas or liquid, or a mixture of gas and liquid, or a mixture of gas and solid to the support substrate.

12. The method of claim 8, wherein a thickness of the substrate is less than or equal to 1.5 mm.

13. The method of claim 8, wherein a thickness of the support substrate is from 1 mm to 10 cm.

14. An electrically insulating or an electrically semiconducting substrate comprising at least one of a smooth edge and a bevelled edge obtained by the method of claim 1.

15. The method of claim 3, wherein the thermal treatment is controlled by controlling at least one variable selected from the group consisting of:
   an amplitude of the voltage applied;
   a frequency of the voltage applied;
   an impedance of the voltage source connected to the electrode;
   a distance between the edge of the substrate and the electrode;
   a speed of the relative movement between the electrode and the substrate; and
   optionally, a grounding of the substrate.

16. The method of claim 9, wherein an intermediate layer is present and the intermediate layer is a fluid.

17. The method of claim 11, wherein the support substrate is actively cooled at a side of the support substrate facing away from the substrate to be bevelled.

18. The method of claim 8, wherein a thickness of the substrate is less than or equal to 1 mm.

* * * * *